United States Patent
Wen et al.

(10) Patent No.: US 11,375,152 B2
(45) Date of Patent: Jun. 28, 2022

(54) VIDEO FRAME INTERPOLATION APPARATUS AND METHOD

(71) Applicant: FUJITSU LIMITED, Kawasaki (JP)

(72) Inventors: Sihan Wen, Beijing (CN); Jing Zhou, Beijing (CN); Zhiming Tan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/227,051

(22) Filed: Apr. 9, 2021

(65) Prior Publication Data
US 2021/0368131 A1    Nov. 25, 2021

(30) Foreign Application Priority Data
May 20, 2020 (CN) .......................... 202010431003.6

(51) Int. Cl.
*H04N 7/01* (2006.01)
*G06N 3/08* (2006.01)

(52) U.S. Cl.
CPC ............. *H04N 7/0137* (2013.01); *G06N 3/08* (2013.01); *H04N 7/0102* (2013.01)

(58) Field of Classification Search
CPC .. H04N 7/0137; H04N 7/0102; H04N 7/0127; H04N 21/4402; G06N 3/08;
(Continued)

(56) References Cited
U.S. PATENT DOCUMENTS
10,958,869 B1 *   3/2021   Chi ..................... G06N 3/0454
2019/0138889 A1   5/2019   Jiang et al.
(Continued)

FOREIGN PATENT DOCUMENTS
CN    107613299 A  *  1/2018
CN    109905624 A     6/2019
(Continued)

OTHER PUBLICATIONS

Niklaus et al.; "Video Frame Interpolation via Adaptive Separable Convolution"; Portland State University, Proceedings of the IEEE International Conference on Computer Vision; Computer Vision Foundation; Dec. 31, 2017; http://graphics.cs.pdx.edu/project.sepconv; pp. 261-270; (10 pages).
(Continued)

*Primary Examiner* — Michael Lee
(74) *Attorney, Agent, or Firm* — Staas & Halsey LLP

(57) ABSTRACT

Embodiments of this disclosure provide a video frame interpolation apparatus and method. The method includes calculating a bidirectional optical flow between a first frame and a second frame; an performing kernel and weight estimation according to the first frame and the second frame. An adaptive local convolutional kernel is generated by using a convolutional layer and a weight coefficient is generated by using another convolutional layer. A conversion on the first frame and the second frame is performed by using an adaptive conversion layer according to the bidirectional optical flow, the weight coefficient and the adaptive local convolutional kernel, so as to generate a conversion frame. A frame synthesis on the first frame, the second frame and the conversion frame is performed to generate an interpolation frame between the first frame and the second frame.

10 Claims, 6 Drawing Sheets

(58) Field of Classification Search
CPC . G06T 2207/20081; G06T 2207/20084; G06T 3/4007; G06T 7/269
USPC .......................................................... 348/441
See application file for complete search history.

(56) References Cited

U.S. PATENT DOCUMENTS

| | | | |
|---|---|---|---|
| 2020/0012940 A1* | 1/2020 | Liu | G06T 3/4007 |
| 2020/0160528 A1* | 5/2020 | Rhodes | G06V 20/49 |
| 2020/0394752 A1* | 12/2020 | Liu | G06N 5/046 |
| 2021/0122367 A1* | 4/2021 | Yao | G06K 9/6218 |
| 2021/0158512 A1* | 5/2021 | Sun | G06T 3/0093 |
| 2022/0067886 A1* | 3/2022 | Bui | G06V 10/44 |

FOREIGN PATENT DOCUMENTS

| | | | | |
|---|---|---|---|---|
| CN | 110809126 A | 2/2020 | | |
| WO | WO-2020150264 A1 * | 7/2020 | | G06N 3/0454 |

OTHER PUBLICATIONS

Wenbo Bao et al.; "Depth-Aware Video Frame Interpolation"; Institute of Image Communication and Network Engineering, Shanghai Jiao Tong University, Computer Vision Foundation; https://github.com/baowenbo/DAIN; 2017; pp. 3703-3712; (10 pages).

Feng Liu et al.; "Context-Aware Synthesis for Video Frame Interpolation"; Computer Vision Foundation; 2018; http://graphics.cs.pdx.edu/project/ctxsyn; pp. 1701-1710 (10 pages).

\* cited by examiner

VIDEO FRAME INTERPOLATION APPARATUS AND METHOD

CROSS-REFERENCE TO RELATED APPLICATIONS

This application claims priority under 35 USC 119 to Chinese patent application no. 202010431003.6, filed on May 20, 2020, in the China National Intellectual Property Administration, the entire contents of which are incorporated herein by reference.

TECHNICAL FIELD

This disclosure relates to the field of video processing.

BACKGROUND

Interpolation of video frames is one of the main problems in the field of video processing in computer vision, and interpolation frames (also referred to as intermediate frames) in continuous frames may be synthesized. Interpolation of video frames may be applicable to many applications, such as video compression, slow motion generation, and frame rate up-conversion, etc.

In interpolation of video frames, a reference position for estimating a value of each pixel may be found on an input frame, and then a pixel value of an output interpolation frame may be obtained with reference to the pixel value. Interpolation of video frames based on deep learning may include a kernel estimation method, a kernel is adaptively estimated for each pixel, and the interpolation frame is synthesized by a convolution operation. In addition, it may also include a flow estimation method, in which a flow vector pointing to a reference position is estimated for each output pixel.

At present, with the development of deep convolutional neural networks, many methods in this field have made considerable progress. For example, there are references currently proposed to calculate bidirectional optical flows, generate conversion frames (also referred to as warped frames) based on an adaptive conversion layer (adaptive warping layer), and then perform frame synthesis to obtain the interpolation frames.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that accuracy of optical flows is hard to be ensured due to relatively large motions and occlusions, and it is still difficult to generate interpolation frames of high quality.

Addressed to at least one the above problems, embodiments of this disclosure provide a video frame interpolation apparatus and method, which may further improve a peak signal-to-noise ratio (PSNR), and generate interpolation frames of high quality.

According to an aspect of the embodiments of this disclosure, there is provided a video frame interpolation apparatus, including: an optical flow calculating unit configured to calculate a bidirectional optical flow between a first frame and a second frame; an estimating unit configured to perform kernel and weight estimation according to the first frame and the second frame; wherein an adaptive local convolutional kernel is generated by using a convolutional layer and a weight coefficient is generated by using another convolutional layer; a converting unit configured to perform conversion on the first frame and the second frame by using an adaptive conversion layer according to the bidirectional optical flow, the weight coefficient and the adaptive local convolutional kernel, to generate a (one or more) conversion frames; and a synthesizing unit configured to perform frame synthesis on the first frame, the second frame and the conversion frames to generate an interpolation frame between the first frame and the second frame.

According to another aspect of the embodiments of this disclosure, there is provided a video frame interpolation method, including: calculating a bidirectional optical flow between a first frame and a second frame; performing kernel and weight estimation according to the first frame and the second frame; wherein an adaptive local convolutional kernel is generated by using a convolutional layer and a weight coefficient is generated by using another convolutional layer; performing conversion on the first frame and the second frame by using an adaptive conversion layer according to the bidirectional optical flow, the weight coefficient and the adaptive local convolutional kernel, to generate a (one or more) conversion frames; and performing frame synthesis on the first frame, the second frame and the conversion frames to generate an interpolation frame between the first frame and the second frame.

An advantage of the embodiments of this disclosure exists in that the kernel and weight estimation is performed according to the first frame and the second frame; wherein an adaptive local convolutional kernel is generated by using a convolutional layer and a weight coefficient is generated by using another convolutional layer. Hence, information from neighboring pixels may be fully utilized, and a PSNR may further be improved, thereby generating interpolation frames of high quality.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

Embodiment of a First Aspect

Figure 1:
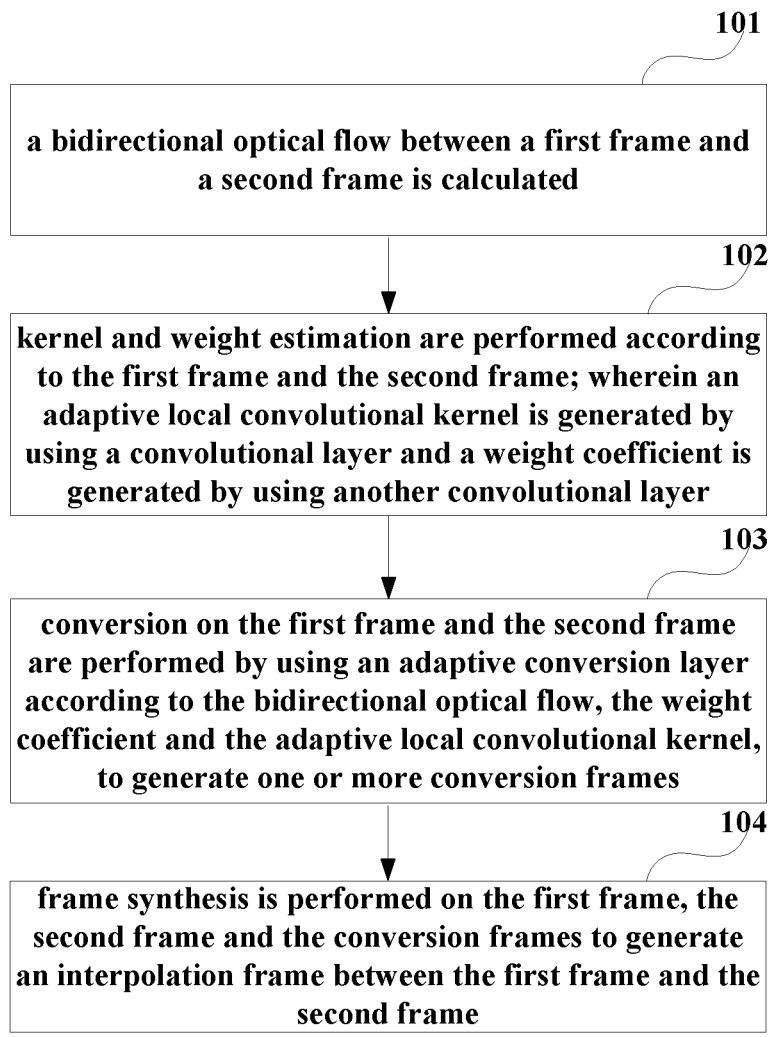
FIG. 1 is schematic diagram of the video frame interpolation method of an embodiment of this disclosure.

The embodiments of this disclosure provide a video frame interpolation method. FIG. 1 is schematic diagram of the video frame interpolation method of the embodiment of this disclosure. As shown in FIG. 1, the method includes:

101: a bidirectional optical flow between a first frame and a second frame is calculated;

102: kernel and weight estimation are performed according to the first frame and the second frame; wherein an adaptive local convolutional kernel is generated by using a convolutional layer and a weight coefficient is generated by using another convolutional layer;

103: conversion on the first frame and the second frame are performed by using an adaptive conversion layer according to the bidirectional optical flow, the weight coefficient and the adaptive local convolutional kernel, to generate one or more conversion frames; and 104: frame synthesis is performed on the first frame, the second frame and the conversion frames to generate an interpolation frame between the first frame and the second frame.

It should be noted that FIG. 1 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 2.

In the embodiment of this disclosure, the interpolation frame may be expressed as frame t, and the first frame and the second frame may be expressed as frame t−1 and frame t+1, respectively. PWC-Net may be used to estimate the bidirectional optical flow $F_{t-1 \to t+1}$ and $F_{t+1 \to t-1}$ between two input frames (frame t−1 and frame t+1). PWC-Net uses a multi-scale feature pyramid model, which performs well in standard benchmarking tests and is also very efficient in calculation. However, this disclosure is not limited thereto, and other methods may also be used to calculate the bidirectional optical flow, and reference may be made to related techniques for how to particularly calculate.

In the embodiment of this disclosure, the kernel and weight estimation may be performed based on a U-Net architecture according to the first frame and the second frame. Here, the kernel refers to, for example, an adaptive local convolutional kernel to be allocated to each pixel in an image, and the weight represents, for example, a distance from a pixel to a reference position in a reference image. Reference may be made to related techniques for particular contents of U-Net architecture.

In some embodiments, feature extraction is perform on the first frame and the second frame and multiple times of down-sampling is performed to obtain features of different dimensions; multiple times of up-sampling is perform on the obtained feature of the highest dimension to obtain a processed feature; a first convolutional layer is used for the processed feature and a rectified linear unit (relu) function is used to obtain an adaptive local convolutional kernel; and a second convolutional layer is used for the processed feature and a sigmoid function is used to obtain a weight coefficient. Reference may be made to related techniques for the convolution operations, convolutional layers, relu function and sigmoid function, which shall not be described herein any further.

Figure 2:
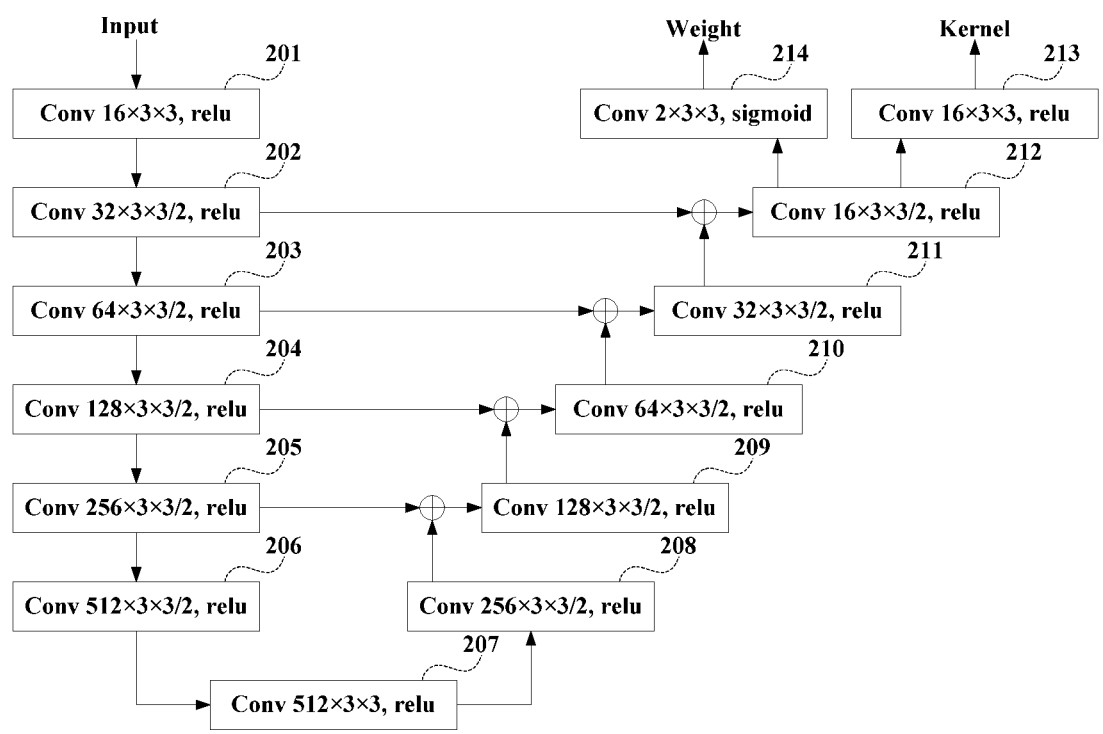
FIG. 2 is an exemplary diagram of the kernel and weight estimation of an embodiment of this disclosure.

FIG. 2 is an exemplary diagram of the kernel and weight estimation of the embodiment of this disclosure. As shown in FIG. 2, the first frame and the second frame may be taken as input for feature extraction and multiple times of down-sampling is performed to obtain down-sampling features of different dimensions (as shown by 201-206 on the left in FIG. 2). For example, the different dimensions include: 16×3×3, 32×3×3/2, 64×3×3/2, 128×3×3/2, 256×3×3/2, 512× 3×3/2, 512×3×3, etc.

As shown in FIG. 2, the obtained feature of the highest dimension (such as Cony 512×3×3, relu denoted, as shown by 207) may be up-sampled multiple times (as shown by 208-212, etc., on the right in FIG. 2), so as to obtain the processed feature (such as Cony 16×3×3/2, relu denoted, as shown by 212).

As shown in FIG. 2, for the processed features (such as Cony 16×3×3/2, relu denoted, as shown by 212), the first convolutional layer is used and the relu function (such as Cony 16×3×3, relu denoted, as shown by 213) is used to obtain the adaptive local convolutional kernel; and for the processed feature (such as Cony 16×3×3/2, relu denoted, as shown by 212), the second convolutional layer is used and the sigmoid function (such as Cony 2×3×3, sigmoid denoted, as shown by 214) to obtain the weight coefficient.

Therefore, one convolutional layer may be used to generate the adaptive local convolutional kernel and another convolutional layer may be used to generate the weight coefficient. Hence, information from neighboring pixels may be fully utilized, and a PSNR may further be improved, thereby generating interpolation frames of high quality.

In some embodiments, down-sampling features of different dimensions are obtained by multiple times of down-sampling, and up-sampling features of different dimensions are obtained by multiple times of up-sampling. And the down-sampling feature of a first dimension and the up-sampling features of identical dimensions may be summed up and taken as the input of the convolutional layer to obtain up-sampling feature of a second dimension.

For example, as shown in FIG. 2, a down-sampling feature of 256×3×3/2 (such as Cony 256×3×3/2, relu denoted, as shown by 205) and an up-sampling feature of an identical dimension (such as Cony 256×3×3/2, relu denoted, as shown by 208) are summed up and taken as input of a convolutional layer to obtain an up-sampling feature of 128×3×3/2 (such as Cony 128×3×3/2, relu denoted, as shown by 209).

As shown in FIG. 2, a down-sampling feature of 128×3× 3/2 (such as Cony 128×3×3/2, relu denoted, as shown by 204) and an up-sampling feature of an identical dimension (such as Cony 128×3×3/2, relu denoted, as shown by 209) are summed up and taken as input of another convolutional layer to obtain an up-sampling feature of 64×3×3/2 (such as Cony 64×3×3/2, relu denoted, as shown by 210).

As shown in FIG. 2, a down-sampling feature of 64×3× 3/2 (such as Cony 64×3×3/2, relu denoted, as shown by 203) and an up-sampling feature of an identical dimension (such as Cony 64×3×3/2, relu denoted, as shown by 210) are summed up and taken as input of still another convolutional layer to obtain an up-sampling feature of 32×3×3/2 (such as Cony 32×3×3/2, relu denoted, as shown by 211).

As shown in FIG. 2, a down-sampling feature of 32×3× 3/2 (such as Cony 32×3×3/2, relu denoted, as shown by 202) and an up-sampling feature of an identical dimension (such as Cony 32×3×3/2, relu denoted, as shown by 211) are summed up and taken as input of yet another convolutional layer to obtain an up-sampling feature of 16×3×3/2 (such as Cony 16×3×3/2, relu denoted, as shown by 212).

Therefore, the embodiment of this disclosure, the features of identical dimensions are summed up, instead of connecting the down-sampling features to the up-sampling features by concat, which may retain the information from the upper layer, is beneficial to improve quality of the images, and may further reduce network parameters.

In some embodiments, the kernel and weight estimation may also be performed according to the calculated bidirectional optical flow, the first frame and the second frame. By also taking the bidirectional optical flow as input of the kernel and weight estimation, a result of the kernel and weight estimation may be made more accurate.

Figure 3:
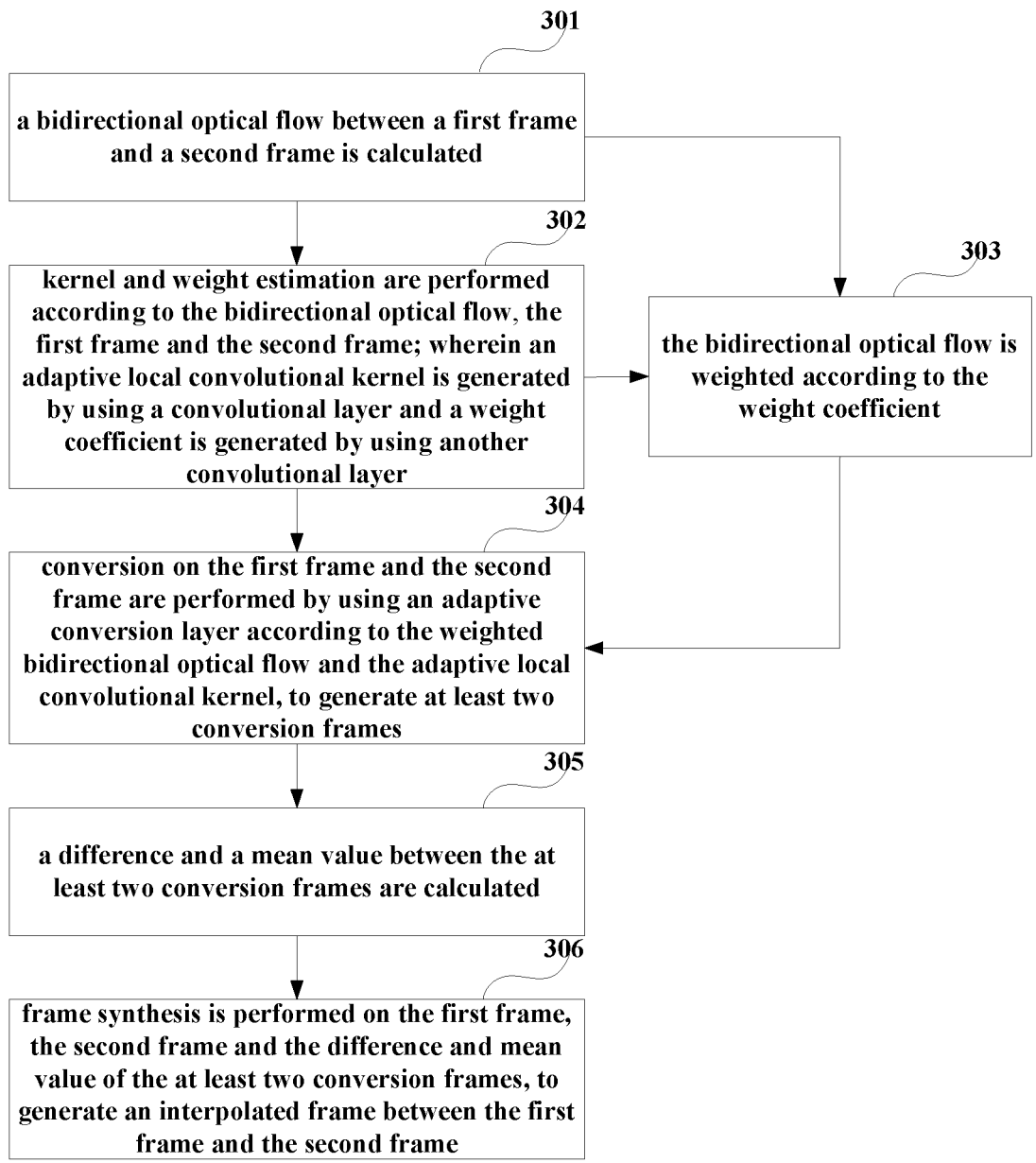
FIG. 3 is another schematic diagram of the video frame interpolation method of the embodiment of this disclosure.

FIG. 3 is another schematic diagram of the video frame interpolation method of the embodiment of this disclosure. As shown in FIG. 3, the method includes:

301: a bidirectional optical flow between a first frame and a second frame is calculated;

302: kernel and weight estimation are performed according to the bidirectional optical flow, the first frame and the second frame; wherein an adaptive local convolutional kernel is generated by using a convolutional layer and a weight coefficient is generated by using another convolutional layer.

In some embodiments, the bidirectional optical flow, the first frame and the second frame may be taken as the input of FIG. 2.

As shown in FIG. 3, the method further includes:

303: the bidirectional optical flow is weighted according to the weight coefficient.

In some embodiments, after the kernel and weight estimation is performed, the bidirectional optical flow may be weighted according to the weight coefficient. For example, in a traditional method, an intermediate flow is obtained in a manner as follows:

$$Flow_{t-1 \to t} = Flow_{t-1 \to t+1} \times 0.5.$$

However, motion of an object is not always linear, and the above traditional method is unable to further improve image quality.

In the embodiment of this disclosure, the convolutional layer followed by the sigmoid function is used to automatically generate a weight coefficient, and the weight coefficient is limited to be 0~1, which provides an important index between the reference image and the optical flow. For example, the intermediate flow may be obtained in the embodiment of this disclosure in a manner as follows:

$$Flow_{t-1 \to t} = Flow_{t-1 \to t+1} \times weight_0;$$

where, $weight_0$ is the weight coefficient. In this way, non-linear object motions may be denoted, so that the image quality may further be improved.

As shown in FIG. 3, the method further includes:

304: conversion on the first frame and the second frame are performed by using an adaptive conversion layer according to the weighted bidirectional optical flow and the adaptive local convolutional kernel, to generate at least two conversion frames.

In some embodiments, the adaptive local convolutional kernel allocates different weights to multiple neighboring pixels around a current pixel (such as 4×4 pixels; however, it is not limited thereto), and the adaptive conversion layer generates a value of the current pixel according to the multiple neighboring pixels.

Therefore, by obtaining different weights from the kernel and weight estimation, a distance between the optical flow and the reference image may be better represented, and the conversion frame may be obtained more efficiently by using surrounding information, thereby further improving the quality of the image.

In some embodiments, according to the weighted bidirectional optical flow and the adaptive local convolutional kernel, an adaptive warp layer may be used to convert the first frame and the second frame. Reference may be made to related techniques for particular contents of the adaptive conversion layer.

As shown in FIG. 3, the method further includes:

305: a difference and a mean value between the at least two conversion frames are calculated; and

306: frame synthesis is performed on the first frame, the second frame and the difference and the mean value of the at least two conversion frames, to generate an interpolation frame between the first frame and the second frame.

In some embodiments, the adaptive conversion layer may perform conversion on the first frame and the second frame to generate the at least two conversion frames, denoted by, for example, $I_{t1}$ and $I_{t2}$. The difference between the at least two conversion frames may be calculated, and the mean value of the at least two conversion frames may be calculated; and the first frame, the second frame, the difference and the mean value are taken as input for the frame synthesis.

Therefore, more details may be obtained through the information, and outputted image frames may be made more clear. Experimental results show that in comparison with using a single conversion frame, using the difference and mean value of the at least two conversion frames may provide more information, and better image quality may be obtained.

Figure 4:
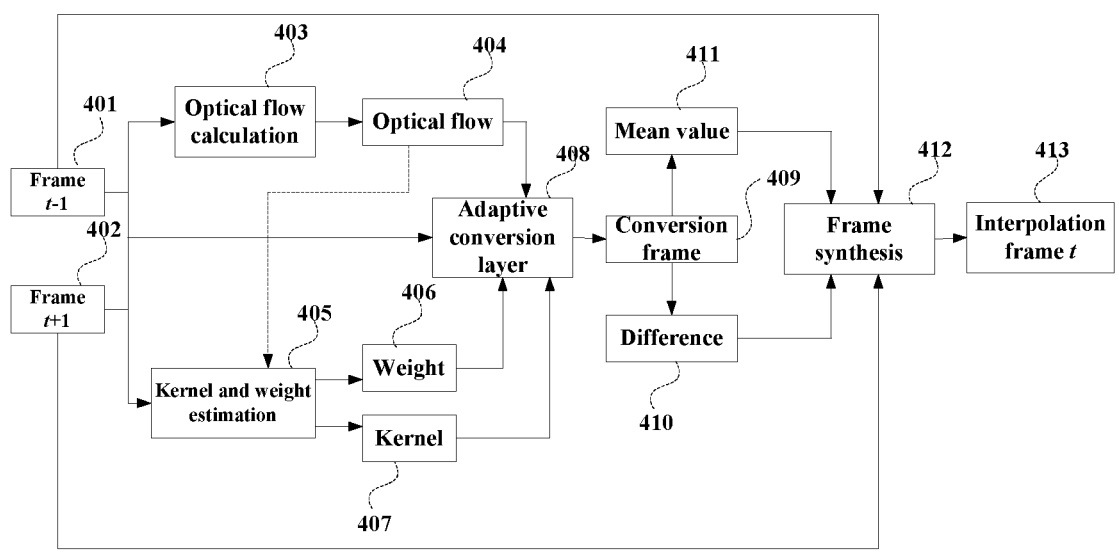
FIG. 4 is a block diagram of interpolation of a video frame of the embodiment of this disclosure.

FIG. 4 is a block diagram of interpolation of a video frame of the embodiment of this disclosure, which shall be described by taking obtaining an interpolation frame t (as shown by 413) based on a frame t−1 (as shown by 401) and a frame t+1 (as shown by 402) as an example.

As shown in FIG. 4, the bidirectional optical flow between frame t−1 and frame t+1 may be calculated, as shown by 403; and then kernel and weight estimation is performed according to frame t−1, frame t+1 and the bidirectional optical flow (as shown by 404), as shown by 405; wherein a convolutional layer is used to generate the adaptive local convolutional kernel and the other convolutional layer is used to generate the weight coefficient.

As shown in FIG. 4, conversion is performed on frame t−1 and frame t+1 by using the adaptive conversion layer (as shown by 408) according to the bidirectional optical flow (as shown by 404), the weight coefficient (as shown by 406) and the adaptive local convolutional kernel (as shown by 407) to generate the at least two conversion frames (as shown by 409).

As shown in FIG. 4, the difference (as shown by 410) and the mean value (as shown by 411) between the at least two conversion frames may be calculated; and frame synthesis performed according to frame t−1 and frame t+1, the difference and the mean value, as shown by 412, to generate the interpolation frame t (as shown by 413) between frame t−1 and frame t+1.

It should be noted that FIGS. 3 and 4 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIGS. 3 and 4.

In some embodiments, a residual structure may be used in the frame synthesis, and a deformable convolutional network (DCN) may be used after the residual structure.

Figure 5:
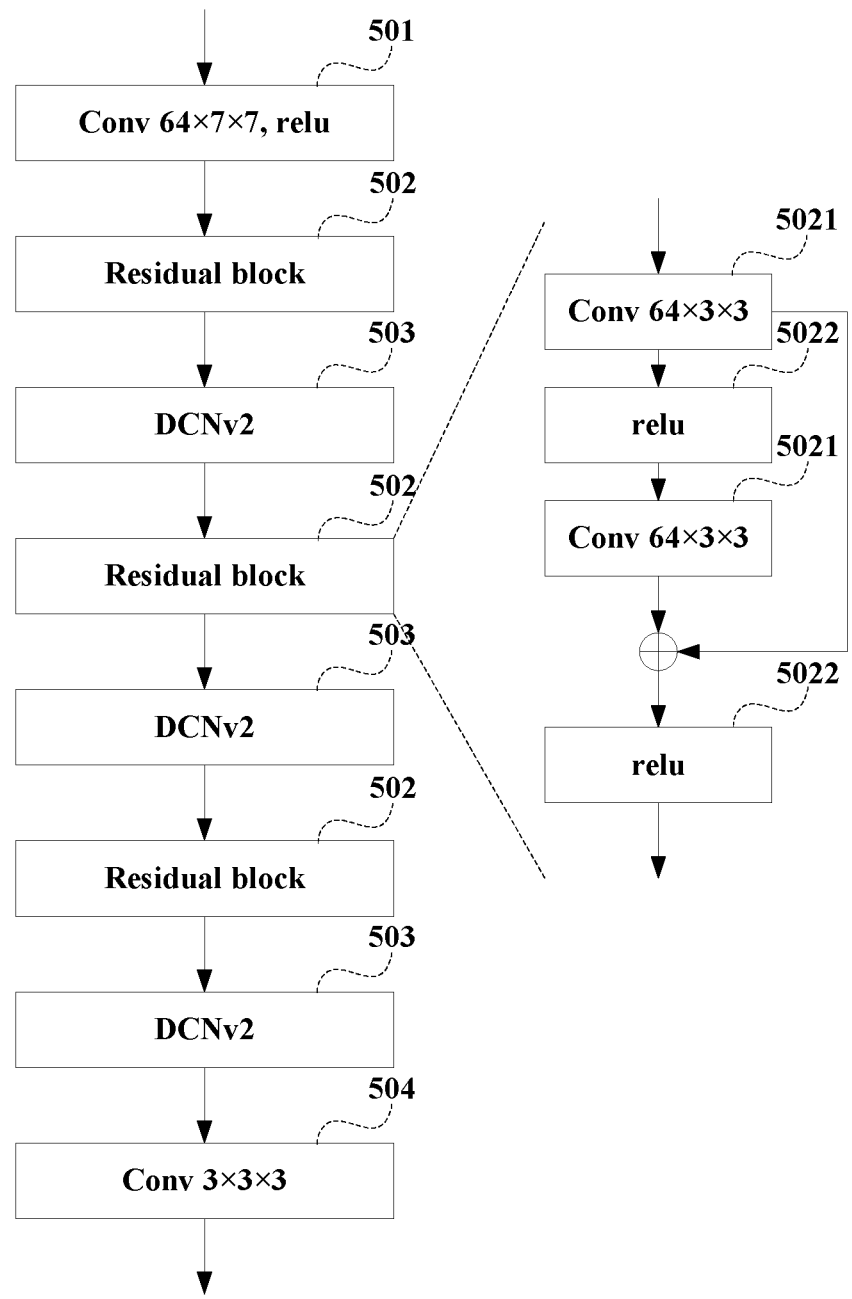
FIG. 5 is a schematic diagram of a network structure of frame synthesis of the embodiment of this disclosure.

FIG. 5 is a schematic diagram of a network structure of frame synthesis of the embodiment of this disclosure. For example, as shown on the left side of FIG. 5, a convolutional operation may be performed in input (as shown by Cony 64×7×7, relu of 501), and then a residual block operation is performed, as shown by 502. After each residual block, the deformable convolutional network v2 (DCNv2) is embedded in the frame synthesis network, as shown by 503. As shown by 504, a Cony 3×3×3 operation may also be included.

As shown on the right side of FIG. 5, the residual block may have a structure of the residual network, for example, as shown by 5021, which includes a Cony 64×7×7 operation, as shown by 5022, and further includes a relu operation. Reference may be made to related techniques for particular contents of the residual block and DCNv2 in FIG. 5.

Therefore, by using DCNv2 in the network structure of frame synthesis, the frame synthesis may better select surrounding related information, and may compensate for occluded pixels or erroneous interpolated pixels, thereby further improving the quality of the image.

The above describes only the steps or processes related to this disclosure; however, this disclosure is not limited thereto. The video frame interpolation method may further include other steps or processes, and reference may be made to the relevant art for particular contents of these steps or processes. Moreover, the embodiments of this disclosure are described above by taking some network structures of deep learning as an example. However, this disclosure is not limited to these structures, and appropriate modifications may be made to these structures, and implementations of these modifications should be included in the scope of the embodiments of this disclosure.

The embodiments of this disclosure are exemplarily described above; however, this disclosure is not limited thereto, and appropriate modifications may be made on the basis of the above embodiments. For example, the above embodiments may be used separately, or one or more of the above embodiments may be used in a combined manner.

It can be seen from the above embodiments that the kernel and weight estimation is performed according to the first frame and the second frame; wherein an adaptive local convolutional kernel is generated by using a convolutional layer and a weight coefficient is generated by using another convolutional layer. Hence, information from neighboring pixels may be fully utilized, and a PSNR may further be improved, thereby generating interpolation frames of high quality.

Embodiment of a Second Aspect

The embodiments of this disclosure provide a video frame interpolation apparatus, with contents identical those in the first aspect being not going to be described herein any further.

Figure 6:
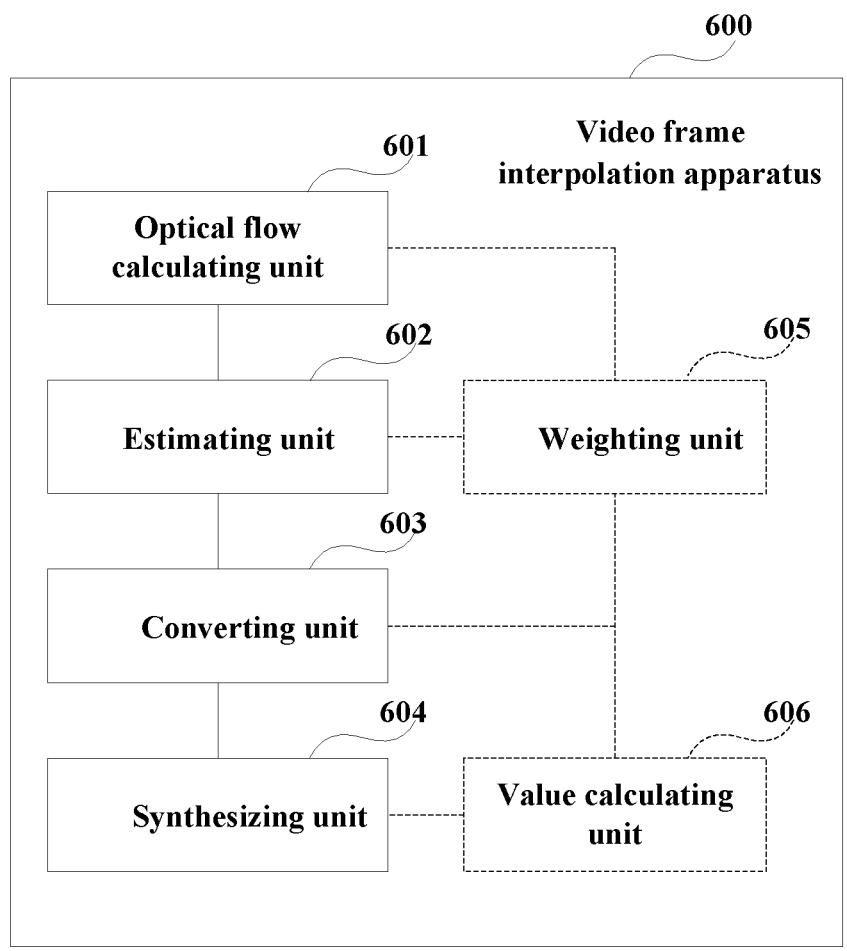
FIG. 6 is a schematic diagram of the video frame interpolation apparatus of an embodiment of this disclosure.

FIG. 6 is a schematic diagram of the video frame interpolation apparatus of an embodiment of this disclosure. As shown in FIG. 6, a video frame interpolation apparatus 600 includes: an optical flow calculating unit 601 configured to calculate a bidirectional optical flow between a first frame and a second frame; an estimating unit 602 configured to perform kernel and weight estimation according to the first frame and the second frame; wherein an adaptive local convolutional kernel is generated by using a convolutional layer and a weight coefficient is generated by using another convolutional layer; a converting unit 603 configured to perform conversion on the first frame and the second frame by using an adaptive conversion layer according to the bidirectional optical flow, the weight coefficient and the adaptive local convolutional kernel, to generate one or more conversion frames; and a synthesizing unit 604 configured to perform frame synthesis on the first frame, the second frame and the conversion frames to generate an interpolation frame between the first frame and the second frame.

In some embodiments, as shown in FIG. 6, the video frame interpolation apparatus 600 further includes: a weighting unit 605 configured to weight the bidirectional optical flow according to the weight coefficient.

In some embodiments, the adaptive local convolutional kernel allocates different weights to multiple neighboring pixels around a current pixel, and the adaptive conversion layer generates a value of the current pixel according to the multiple neighboring pixels.

In some embodiments, the estimating unit 602 is configured to: perform feature extraction on the first frame and the second frame and perform multiple times of down-sampling to obtain features of different dimensions; perform multiple times of up-sampling on an obtained feature of a highest dimension to obtain a processed feature; use a first convolutional layer on the processed feature and use a relu function to obtain the adaptive local convolutional kernel; and use a second convolutional layer on the processed feature and use a sigmoid function to obtain the weight coefficient.

In some embodiments, down-sampling features of different dimensions are obtained by the multiple times of down-sampling, and up-sampling features of different dimensions are obtained by the multiple times of up-sampling, and the estimating unit 602 is further configured to perform summation on down-sampling features of a first dimension and up-sampling features of identical dimensions and take the sum as an input of a convolutional layer to obtain up-sampling features of a second dimension.

In some embodiments, the adaptive conversion layer converts the first frame and the second frame to generate at least two conversion frames.

In some embodiments, as shown in FIG. 6, the video frame interpolation apparatus 600 may further include: a value calculating unit 606 configured to calculate a difference between the at least two conversion frames, and calculate a mean value of the at least two conversion frames.

In some embodiments, the synthesizing unit 604 is further configured to take the first frame, the second frame, the difference and the mean value as an input of the frame synthesis.

In some embodiments, a residual structure is used in the frame synthesis, and a deformable convolutional network is used after the residual structure.

In some embodiments, the estimating unit 602 is further configured to perform the kernel and weight estimation according to the calculated bidirectional optical flow, the first frame and the second frame.

For the sake of simplicity, connection relationships between the components or modules or signal profiles thereof are only illustrated in FIG. 6. However, it should be understood by those skilled in the art that such related techniques as bus connection, etc., may be adopted. And the above components or modules may be implemented by hardware, such as a processor, and a memory, etc., which are not limited in the embodiment of this disclosure.

The embodiments of this disclosure are exemplarily described above; however, this disclosure is not limited thereto, and appropriate modifications may be made on the basis of the above embodiments. For example, the above embodiments may be used separately, or one or more of the above embodiments may be used in a combined manner.

It can be seen from the above embodiments that the kernel and weight estimation is performed according to the first frame and the second frame; wherein an adaptive local convolutional kernel is generated by using a convolutional layer and a weight coefficient is generated by using another convolutional layer. Hence, information from neighboring pixels may be fully utilized, and a PSNR may further be improved, thereby generating interpolation frames of high quality.

Embodiment of a Third Aspect

The embodiments of this disclosure provide an electronic device, including the video frame interpolation apparatus as described in the embodiment of the second aspect, the contents of which being incorporated herein. The electronic device may be, for example, a computer, a server, a work station, a lap-top computer, and a smart mobile phone, etc.; however, the embodiment of this disclosure is not limited thereto.

Figure 7:
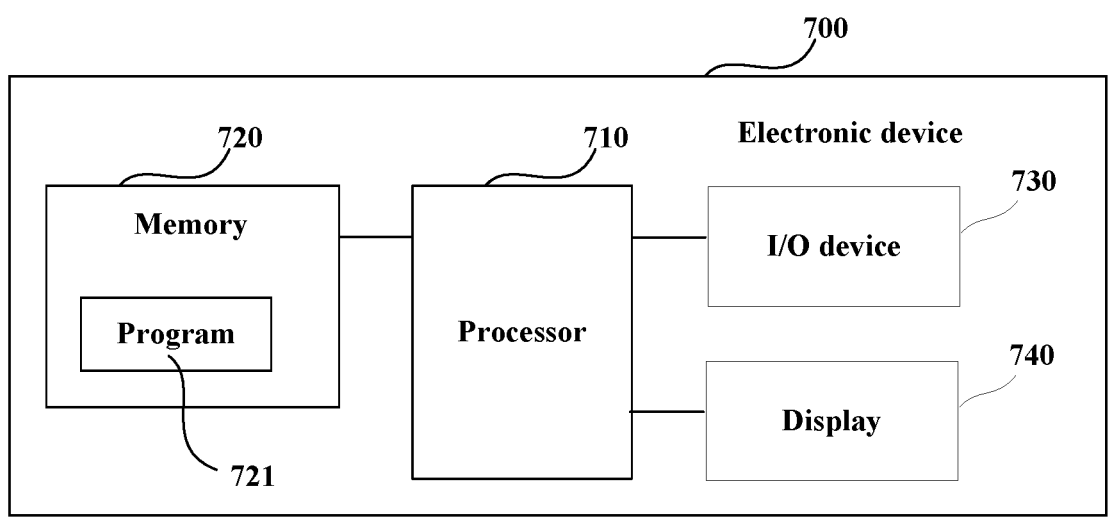
FIG. 7 is a schematic diagram of the electronic device of an embodiment of this disclosure.

FIG. 7 is a schematic diagram of the electronic device of the embodiment of this disclosure. As shown in FIG. 7, an electronic device 700 may include a processor 710 (such as a central processing unit (CPU)) and a memory 720, the memory 720 being coupled to the processor 710. The memory 720 may store various data, and furthermore, it may store a program 721 for information processing, and execute the program 721 under control of the processor 710.

In some embodiments, functions of the video frame interpolation apparatus 600 may be integrated into the processor 710. The processor 710 may be configured to carry out the video frame interpolation method as described in the embodiment of the first aspect.

In some embodiments, the video frame interpolation apparatus 600 and the processor 710 are configured separately. For example, the video frame interpolation apparatus 600 may be configured as a chip connected to the processor 710, and the functions of the video frame interpolation apparatus 600 are executed under control of the processor 710.

In some embodiments, the processor 710 is configured to perform the following control: calculating a bidirectional optical flow between a first frame and a second frame; performing kernel and weight estimation according to the first frame and the second frame; wherein an adaptive local convolutional kernel is generated by using a convolutional layer and a weight coefficient is generated by using another convolutional layer; performing conversion on the first frame and the second frame by using an adaptive conversion layer according to the bidirectional optical flow, the weight coefficient and the adaptive local convolutional kernel, to generate one or more conversion frames; and performing frame synthesis on the first frame, the second frame and the conversion frames to generate an interpolation frame between the first frame and the second frame.

In some embodiments, the processor 710 is configured to perform the following control: weighting the bidirectional optical flow according to the weight coefficient.

In some embodiments, the processor 710 is configured to perform the following control: the adaptive local convolutional kernel allocates different weights to multiple neighboring pixels around a current pixel, and the adaptive conversion layer generates a value of the current pixel according to the multiple neighboring pixels.

In some embodiments, the processor 710 is configured to perform the following control: performing feature extraction on the first frame and the second frame and perform multiple times of down-sampling to obtain features of different dimensions; performing multiple times of up-sampling on an obtained feature of a highest dimension to obtain a processed feature; using a first convolutional layer on the processed feature and using a relu function to obtain the adaptive local convolutional kernel; and using a second convolutional layer on the processed feature and using a sigmoid function to obtain the weight coefficient.

In some embodiments, the processor 710 is configured to perform the following control: obtaining down-sampling features of different dimensions by the multiple times of down-sampling, and obtaining up-sampling features of different dimensions by the multiple times of up-sampling; and performing summation on down-sampling features of a first dimension and up-sampling features of identical dimensions and taking the sum as an input of a convolutional layer to obtain up-sampling features of a second dimension.

In some embodiments, the processor 710 is configured to perform the following control: the adaptive conversion layer converts the first frame and the second frame to generate at least two conversion frames.

In some embodiments, the processor 710 is configured to perform the following control: calculating a difference between the at least two conversion frames, and calculating a mean value of the at least two conversion frames; and taking the first frame, the second frame, the difference and the mean value as an input of the frame synthesis.

In some embodiments, the processor 710 is configured to perform the following control: using a residual structure in the frame synthesis, and using a deformable convolutional network after the residual structure.

In some embodiments, the processor 710 is configured to perform the following control: performing the kernel and weight estimation according to the calculated bidirectional optical flow, the first frame and the second frame.

Furthermore, as shown in FIG. 7, the electronic device 700 may include an input/output (I/O) device 730, and a display 740, etc. Functions of the above components are similar to those in the relevant art, and shall not be described herein any further. It should be noted that the electronic device 700 does not necessarily include all the parts shown in FIG. 7, and furthermore, the electronic device 700 may include parts not shown in FIG. 7, and the relevant art may be referred to.

An embodiment of the present disclosure provides a computer readable program, which, when executed in an electric device, will cause a computer to carry out the video frame interpolation method described in the embodiment of the first aspect in the electronic device.

An embodiment of the present disclosure provides a storage medium, including a computer readable program, which will cause a computer to carry out the video frame interpolation method described in the embodiment of the first aspect in an electronic device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 8-10 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

Supplement 1. A video frame interpolation method, including: calculating a bidirectional optical flow between a first frame and a second frame; performing kernel and weight estimation according to the first frame and the second frame; wherein an adaptive local convolutional kernel is generated by using a convolutional layer and a weight coefficient is generated by using another convolutional layer; performing conversion on the first frame and the second frame by using an adaptive conversion layer according to the bidirectional optical flow, the weight coefficient and the adaptive local convolutional kernel, to generate one or more conversion frames; and performing frame synthesis on the first frame, the second frame and the conversion frames to generate an interpolation frame between the first frame and the second frame.

Supplement 2. The method according to supplement 1, wherein the method further includes: weighting the bidirectional optical flow according to the weight coefficient.

Supplement 3. The method according to supplement 1 or 2, wherein the adaptive local convolutional kernel allocates different weights to multiple neighboring pixels around a current pixel, and the adaptive conversion layer generates a value of the current pixel according to the multiple neighboring pixels.

Supplement 4. The method according to any one of supplements 1-3, wherein in the kernel and weight estimation, feature extraction is performed on the first frame and the second frame and multiple times of down-sampling is performed to obtain features of different dimensions; multiple times of up-sampling is performed on an obtained feature of a highest dimension to obtain a processed feature; a first convolutional layer is used on the processed feature and a relu function is used to obtain the adaptive local convolutional kernel; and a second convolutional layer is used on the processed feature and a sigmoid function is used to obtain the weight coefficient.

Supplement 5. The method according to supplement 4, wherein in the kernel and weight estimation, down-sampling features of different dimensions are obtained by the multiple times of down-sampling, and up-sampling features of different dimensions are obtained by the multiple times of up-sampling.

Supplement 6. The method according to supplement 5, wherein the method further includes: performing summation on down-sampling features of a first dimension and up-sampling features of identical dimensions and taking the sum as an input of a convolutional layer to obtain up-sampling features of a second dimension.

Supplement 7. The method according to any one of supplements 1-6, wherein the adaptive conversion layer converts the first frame and the second frame to generate at least two conversion frames.

Supplement 8. The method according to supplement 7, wherein the method further includes: calculating a difference between the at least two conversion frames, and calculating a mean value of the at least two conversion frames.

Supplement 9. The method according to supplement 8, wherein the method further includes: taking the first frame, the second frame, the difference and the mean value as an input of the frame synthesis.

Supplement 10. The method according to any one of supplements 1-9, wherein a residual structure is used in the frame synthesis, and a deformable convolutional network is used after the residual structure.

Supplement 11. The method according to any one of supplements 1-10, wherein the method further includes: performing the kernel and weight estimation according to the calculated bidirectional optical flow, the first frame and the second frame.

Supplement 12. An electronic device, including a memory and a processor, the memory storing a computer program, and the processor being configured to execute the computer program to carry out the video frame interpolation method as described in any one of supplements 1-11.

The invention claimed is:

1. An apparatus, comprising:
a memory that stores a plurality of instructions; and
a processor coupled to the memory and configured to execute the instructions to:
calculate a bidirectional optical flow between a first frame of a video and a second frame of the video;
perform kernel and weight estimation according to the first frame and the second frame to generate an adaptive local convolutional kernel using a first convolutional layer and a weight coefficient using a second convolutional layer;
perform conversion on the first frame and the second frame by using an adaptive conversion layer according to the bidirectional optical flow, the weight coefficient and the adaptive local convolutional kernel, to generate a conversion frame; and
perform frame synthesis on the first frame, the second frame and the conversion frame to generate an interpolation frame between the first frame and the second frame.

2. The apparatus according to claim 1, wherein the processor is further configured to allocate a weight to the bidirectional optical flow according to the weight coefficient.

3. The apparatus according to claim 1, wherein the adaptive local convolutional kernel allocates different weights to multiple neighboring pixels around a current pixel in the first frame and the second frame, respectively, and the adaptive conversion layer generates a value of the current pixel according to the multiple neighboring pixels.

4. The apparatus according to claim 1, wherein the processor is configured to:
perform feature extraction on the first frame and the second frame and perform multiple times of down-sampling to obtain features of different dimensions;
perform multiple times of up-sampling on a feature of a highest dimension among the obtained different dimensions to obtain a processed feature;
use the first convolutional layer on the processed feature and use a relu function to obtain the adaptive local convolutional kernel; and
use the second convolutional layer on the processed feature and use a sigmoid function to obtain the weight coefficient.

5. The apparatus according to claim 4, wherein down-sampling features of different dimensions are obtained by the multiple times of down-sampling, and up-sampling features of different dimensions are obtained by the multiple times of up-sampling, and
the processor is further configured to perform a sum on down-sampling features of a first dimension among the down-sampling features of different dimensions and on up-sampling features of identical dimensions among the up-sampling features of different dimensions, and take the sum as an input of a third convolutional layer to obtain up-sampling features of a second dimension.

6. The apparatus according to claim 1, wherein the adaptive conversion layer converts the first frame and the second frame to generate at least two conversion frames; and
the processor is further configured to calculate a difference between the at least two conversion frames, and calculate a mean value of the at least two conversion frames.

7. The apparatus according to claim 6, wherein the processor is further configured to take the first frame, the second frame, the difference and the mean value as an input of the frame synthesis.

8. The apparatus according to claim 1, wherein a residual structure is used in the frame synthesis, and a deformable convolutional network is used after the residual structure.

9. The apparatus according to claim 1, wherein the processor is further configured to: perform the kernel and weight estimation according to the bidirectional optical flow, the first frame and the second frame.

10. A video frame interpolation method implemented by a processor coupled to a memory, comprising:
by the processor,
calculating a bidirectional optical flow between a first frame of a video and a second frame of the video;

performing kernel and weight estimation according to the first frame and the second frame to generate an adaptive local convolutional kernel using first a convolutional layer and a weight coefficient using a second convolutional layer;

performing conversion on the first frame and the second frame by using an adaptive conversion layer according to the bidirectional optical flow, the weight coefficient and the adaptive local convolutional kernel, to generate a conversion frame; and performing frame synthesis on the first frame, the second frame and the conversion frame to generate an interpolation frame between the first frame and the second frame.

\* \* \* \* \*